W. F. CLOSE.
WATERING DEVICE.
APPLICATION FILED APR. 8, 1918.
1,288,383.
Patented Dec. 17, 1918.
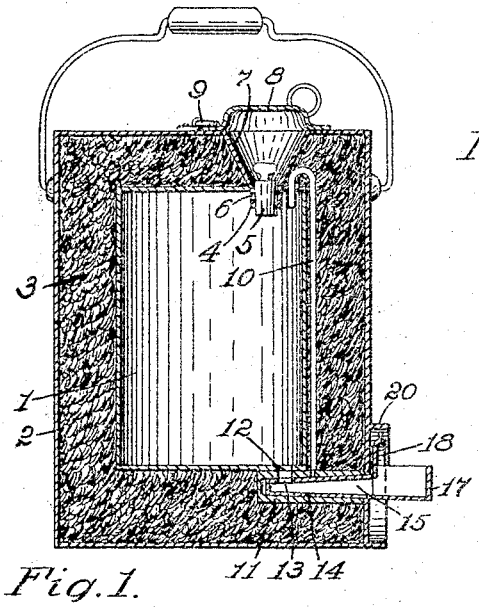
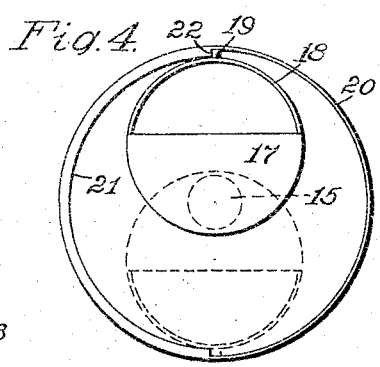
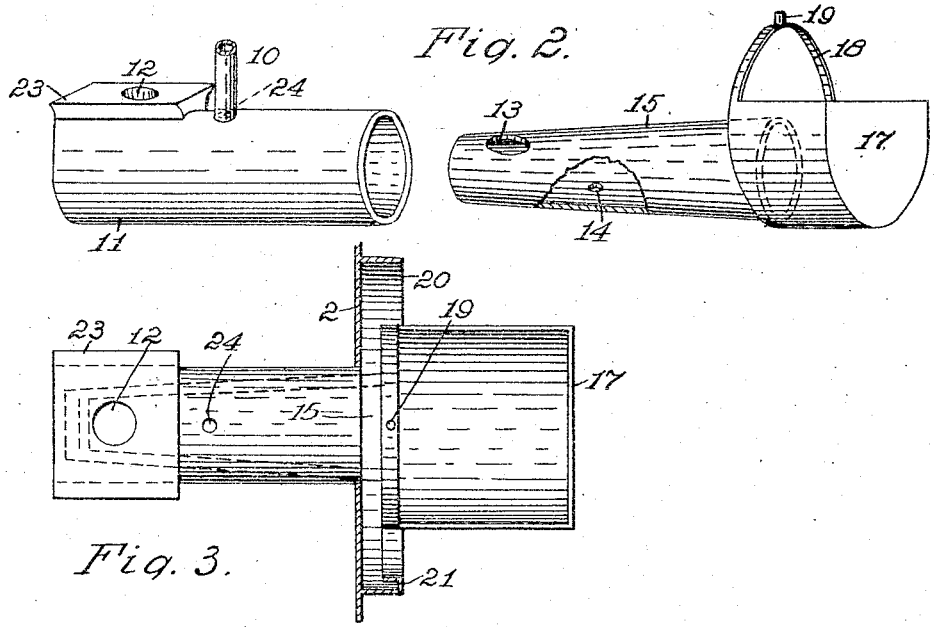
Inventor,
W. F. Close, by
C. C. Kennedy.
Attorney.

UNITED STATES PATENT OFFICE.

WILLIAM F. CLOSE, OF WATERLOO, IOWA.

WATERING DEVICE.

1,288,383.  Specification of Letters Patent.  Patented Dec. 17, 1918.

Application filed April 8, 1918. Serial No. 227,193.

*To all whom it may concern:*

Be it known that I, WILLIAM F. CLOSE, a citizen of the United States of America, and a resident of Waterloo, Blackhawk county, Iowa, have invented certain new and useful Improvements in Watering Devices, of which the following is a specification.

My invention relates to improvements in watering devices, and the object of my improvement is to supply a fountain for watering poultry or animals generally, which is so constructed as to be protected from freezing temperatures, which has means for voiding air therefrom when filling, to prevent excessive bubbling, and which is supplied with new and convenient means for supplying water to fowl; such means being removable, sanitary, and arranged to alternately open and close communication of the fountain with the reservoir, and open and close communication with the means for voiding air from the reservoir.

This object I have accomplished by the means which are hereinafter described and claimed, and which are illustrated in the accompanying drawings, in which Figure 1 is a vertical central section of my improved watering device; Fig. 2 is a perspective detail view, on an enlarged scale, of the parts of the fountain and its receiver, with the parts separated and approximated to each other; Fig. 3 is a top plan view of said parts as assembled, with the dust-ring and supporting casing in horizontal section, and Fig. 4 is a perspective detail view, looking in another direction, of the parts shown in Fig. 3.

Similar numerals of reference denote corresponding parts throughout the several views.

In my improved watering device, which as shown is particularly designed for use by poultry, but which can be varied to conform to the requirements of other fowls or animals, a hollow cylindrical closed end casing 2 is used containing an inner reservoir 1, spaced therefrom, the reservoir also being a hollow cylinder with closed ends. The interspace of said reservoir and inclosing casing may be filled with any suitable packing being a non-conductor of heat, such as saw-dust, mineral wool or the like. In the top of the reservoir is an inlet-port 4, receiving a closure-plug 5 of conical form, hollow and having openings 6 midway in opposite walls, the top of the plug being supplied with a knob to facilitate placing or removal. A hollow conical reëntrant part 7 opening outwardly from the reservoir through the top of the casing 2, affords access to the port 4, for filling purposes. The numeral 10 denotes a siphon-tube whose upper short end passes through the top of said reservoir, being tightly sealed therein and depends slightly below the lateral openings in the walls of the port containing said closure-plug 5. The other and longer member of said tube depends without the reservoir as far as the bottom of the latter.

The reservoir is supplied in its bottom with an outlet-port 12, the orifice of which also traverses a hollow receiving-body or bushing 11, the rear part of whose top is flattened at 23 with said flat top soldered on the bottom of the tank. The body 11 is of tubular form, closed at the rear, open at the front and having a longitudinal conical hollow-ground bore in which is fitted a conical ground conduit 15 to rock therein, and which is removable therefrom. The conduit 15 has in the rear part of its top an orifice 13 adapted to register with the outlet 12 when the conduit is rocked into position therefor. On the opposite side of said conduit is a small orifice 14 adapted when the conduit has been rotated a half-turn, to be in registration with a like orifice 24 in the top of the body 11, the orifice 24 being in registration with and sealed to the lower open end of the siphon-tube 10. On the front open end of the conduit 15 is fixed an open-top fountain or receptacle 17, the latter having a raised rear wall of circular form with forwardly-extending rim as shown at 18, the conduit 15 opening into said fountain through said wall below the level of the upper edge of the front wall of said fountain. An annular dust-ring 20 is fixed on the casing 2 around said conduit and concentric therewith. The inner left-hand half of the inner wall of said dust-ring has an inwardly extending flange 21, whose ends or shoulders 22 are diametrically opposite each other at the top and bottom of the ring and serve as stops for a fixed stud or pin 19 on the flange of the fountain back-plate 18. When the fountain and connected conical conduit 15 is rocked in one direction toward one shoulder 22 the stop locates the orifice 13 of the conduit in registration with the outlet-port 12, to let water flow from the reservoir through the conduit into said fountain 17, where it is held below the level of the front wall of the fountain by reason of the induced vacuum in the reservoir. When the fountain and conduit are rocked in a reversed direction one half turn, to stop against the other shoulder 22, the orifices 13 and 12 are out of registration, the port 12 is closed, and the orifices 14 and 24 and the lower end of the siphon-tube brought into registration, to allow air to flow from the siphon, and conduit at the beginning of filling of the reservoir to prevent bubbling of air through the inlet-port 4 to obstruct the free passage of water thereinto. After the reservoir is completely filled, the plug 5 is inserted in the port 4. The siphon after the filling of the reservoir and forcing of a column of water through its arch, will then act to transport water from the top of the reservoir to a level below the lower end of the siphon upper member. During said filling operation, the conduit should be in a position with its orifice 14 in registration with the orifice 24 and said siphon-tube, the orifice 12 being closed. When the reservoir is filled, the conduit can be rocked back to shut off the siphon, and to reopen communication between the orifices 12 and 13, to permit the fountain 17 to receive a charge of water.

The conduit 15 may be easily removed for cleaning, but on account of its ground-fit with the hollow of the body 11, cannot be readily pulled out longitudinally by a fowl or animal, though easily rocked either way. The packing 3 prevents freezing of the contents of the reservoir in cold weather.

The orifices 6 in the port walls 4 for the plug 5, are useful, after removal of the plug, in the filling of the reservoir, by giving lateral passages for the liquid in filling, to thereby hasten the filling process.

Having described my invention, what I claim as new, and desire to secure by Letters Patent, is:

1. In a watering device, a closed reservoir having an inlet-port in its top, a closure therefor, said reservoir having an outlet-port in its bottom, controlling-means for said outlet-port comprising a fixed bushing in communication with said outlet-port, said bushing having a conical bearing-seat, a conical hollow conduit rotatably mounted in said conical seat removably and having a port adapted to be placed in communication with said outlet-port by the communication therewith in said bushing when the conduit is rocked appropriately, and a receptacle fixed on the outer end of said conduit, in communication therewith, and adapted to receive a supply of liquid from the reservoir by way of the conduit and its said communications with the reservoir.

2. In a watering device, a closed reservoir having an inlet-port in its top, a closure therefor, said reservoir having an outlet-port in its bottom, a siphon-tube entering the top of the reservoir and also depending outwardly thereof to its bottom, and controlling means for alternately opening and closing the outlet-port and the lower end of said siphon-tube, comprising a fixed bushing on the reservoir in communication with the said outlet-port, the bushing having a hollow-ground conical bore, and an orifice opening into the lower end of said siphon-tube, a conical ground conduit seated rotatably in the bore of said bushing and having oppositely located orifices one of which may be placed in communication with said outlet-port by way of the communication in the bushing and the other alternately placed in communication with the siphon-tube by way of the orifice in the bushing, and an open-top receptacle fixed on the outer end of said conduit to receive therefrom.

3. In a watering device, a closed reservoir having an inlet-port in its top, a closure therefor, said reservoir having an outlet-port in its bottom, means for controlling the delivery of said outlet-port, comprising a hollow conduit adapted to be rocked to place its hollow into communication or out of communication with the outlet-port, a receptacle fixed on the outer end of the conduit to receive a charge of liquid therefrom delivered from said outlet-port, a projecting dust-catching ring-body mounted around said conduit and the rear of said receptacle, and means on said dust-ring and on said conduit adapted to contact to limit the extent of rotation of the conduit in either direction.

Signed at Waterloo, Iowa, this 23rd day of March, 1918.

WILLIAM F. CLOSE.

Copies of this patent may be obtained for five cents each, by addressing the "Commissioner of Patents, Washington, D. C."